April 18, 1933.    O. B. CARSON    1,904,852

SPECTACLES

Filed Nov. 30, 1931

INVENTOR
Oswald B. Carson
BY
Waldo M. Chapin
ATTORNEY

Patented Apr. 18, 1933

1,904,852

UNITED STATES PATENT OFFICE

OSWALD B. CARSON, OF GREENBURG, NEW YORK

SPECTACLES

Application filed November 30, 1931. Serial No. 577,975.

It has been common practice to attach or hinge the temples of spectacles to the lenses, or to the frames in which the lenses are mounted, at the upper, outer edge thereof in order not to obscure the sidewise field of vision.

To attach the temples to the lenses or lens frames at an obtuse angle, at a point above the horizontal line passing through the geometrical center of the lens, so that the lower portion of the lens will be brought nearer the eye and the bridge be prevented from riding downwardly on the nose, is also well known.

My invention accomplishes both of these functions and at the same time provides means whereby certain desirable adjustment may be quickly and easily accomplished.

In order to compensate for unusually wide features, the optician sometimes finds it necessary to fit a patient with larger lenses, or with lenses having a greater diameter horizontally crosswise thereof so as to position the joinder of the temples and lenses sufficiently far apart to avoid objectionable contact with the temples or sides of the face of the wearer. This practice not only has the disadvantage that it compels the optician to carry in stock spectacle frames, lenses and temples of a wide range of size, but it leads to violation of the esthetic when the patient must be fitted with lenses of such size as to be unbecoming. The only means for such longitudinal adjustment of spectacles heretofore has been that very limited lengthening afforded by the straightening out of the bridge member.

Another desirable adjustment which in the usual construction of spectacles has been very limited is that of the positioning of the lenses with respect to the eye. For instance, it is desirable for reading spectacles to position the lower part of the lenses nearer the eye, and for one whose occupation necessitates his looking upward, it is desirable to position the top of the lenses nearer the eye. These and many adjustments between the two extremes are desirable both from the physical and the esthetic standpoint.

My invention relates to spectacles which will present no obstacle to the useful field of vision and which are susceptible of adjustment to fit any width of face and to position the lenses at desired vertical angles with respect to the eye.

Specifically my invention resides in the provision of an adjustable link intermediate the temples and the lenses or lens frames and mounted at the top of the latter.

One of the objects of my invention is to provide means for relative adjustment between the lenses and temples of spectacles.

Another object is to eliminate obstructions to the field of vision.

Another object is to provide a structure graceful in its appearance, simple in its construction, and durable in its use.

These and other objects will more fully hereinafter be pointed out.

In the ordinary type of spectacles the temples are usually hinged to the lenses or lens frames at their extreme outer peripheral point. This necessitates an enlargement or end piece at that point which is objectionable because of its conspicuousness, and because it, together with the attached temples, imposes an obstruction to the sidewise vision of the wearer. Attempts have been made to overcome the latter objection by locating the hinges on the rim above the horizontal line passing through the geometrical center of the lenses, but the objectionable conspicuousness of the joinder is not overcome merely by changing its location.

By my invention I overcome both of these objectionable features by adopting a construction which enables me to make contact with the lens at the top thereof and in an inconspicuous manner, eliminating all obstructions to the useful field of vision beyond the peripheral edges of the lenses.

My invention resides in the employment of a link member between the lens or lens frame and the temples, which member at one end is either hinged at or near the upper peripheral portion of the lens or is attached at that point in some other suitable manner, and to the other end of which the temple is hinged. This link is of such construction that it will be capable of universal adjustment by bending for purposes which will more fully hereinafter appear.

Figure 1:
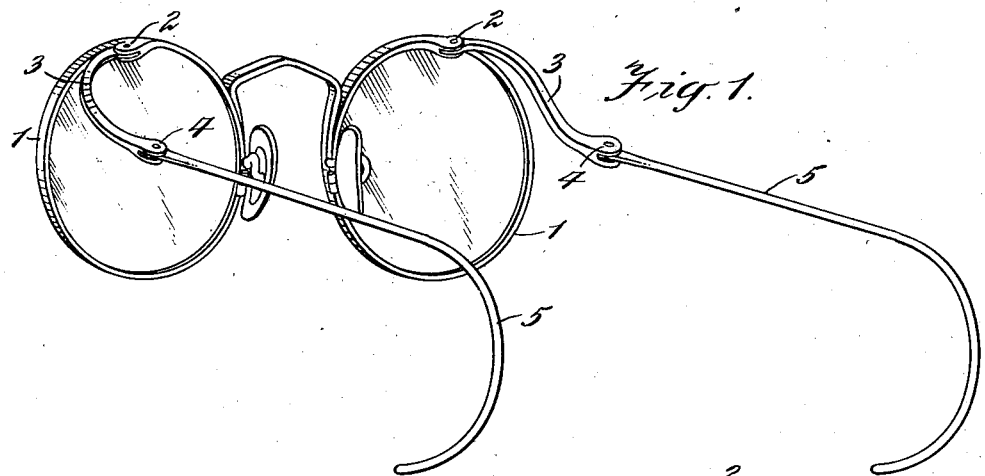
Fig. 1 is a perspective view of a pair of spectacles embodying my invention.
Figure 2:
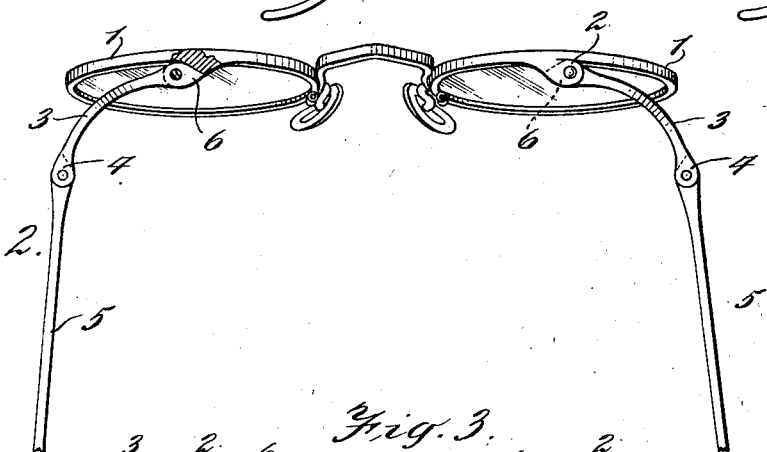
Fig. 2 is a top perspective view of the same.
Figure 3:
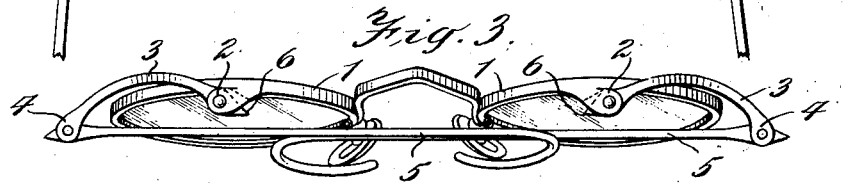
Fig. 3 is a view showing the temples and the intermediate link members in folded relationship.

Referring to the accompanying drawing, Figs. 1, 2 and 3, the lenses are shown as mounted in the usual frames 1. At the upper peripheral portion of the lens frame there is hinged as at 2 a link member 3. This link from its point of attachment to the lens extends rearwardly, downwardly and outwardly and terminates at its other end in a hinged connection 4 for the reception of the temple 5. This link is preferably so formed that it follows generally the upper, outer peripheral contour of the lens rim and is accordingly partially concealed thereby.

For the purpose of limiting the rearward swing of the link 3, I provide thereon a lug 6 which engages one side of the slot, as shown in Fig. 2.

The axes of the two hinges 2 and 4, in order to allow the temples to fold horizontally across the frame, and in order to prevent uneven wear due to tortional strain, are maintained in substantial parallelism.

The link 3 is made of pliable material so that it may be adjusted with pliers by the optician to occupy at its rearward end different planes and angular positions relative to the lens, and it must be of sufficient rigidity to maintain any shape to which it may be adjusted.

To accommodate the spectacles to the use of a patient having unusually wide features, the rear ends of the links 3 may be bent outwardly, away from each other, so that the temples will not objectionably contact with the wearer's face.

In the normal application of spectacles made according to my invention the rear ends of the links 3 will occupy a position in a plane which will be above the horizontal plane in which the bridge engages the nose of the wearer. If it is desired, however, to position the lower portion of the lenses nearer the eyes of the patient, as for reading lenses, the rear portions of the links 3 may be bent downwardly to thus tilt the lenses about the bridge or bridge pads as a fulcrum and bring the lower portion of the lenses nearer the eyes. If it is desired to bring the upper portion of the lenses nearer the eyes, the rear portions of the links 3 may be bent upwardly to thus pull in the lenses at the top.

The advantage of having the links 3 hingedly attached to the lenses will be apparent from the illustration of the folded spectacles shown in Fig. 3 where it will be seen that the links 3 pivot about the hinge 2, when the spectacles are closed, and a part of the links swing forward beyond the front face of the lenses enabling a compact folding to fit a thin spectacle case.

I may find it desirable to place within the hinges 2 small springs which will tend to urge the links forwardly so that a mild tension is established between the lenses and the point of engagement of the temples back of the ears. The provision of such a spring is so obvious to one skilled in the art that I have not illustrated it. An advantage flowing from this construction is that the links will automatically assume positions forward or back to compensate for differences in distance between the lenses and the back of the wearer's ears.

Figure 4:
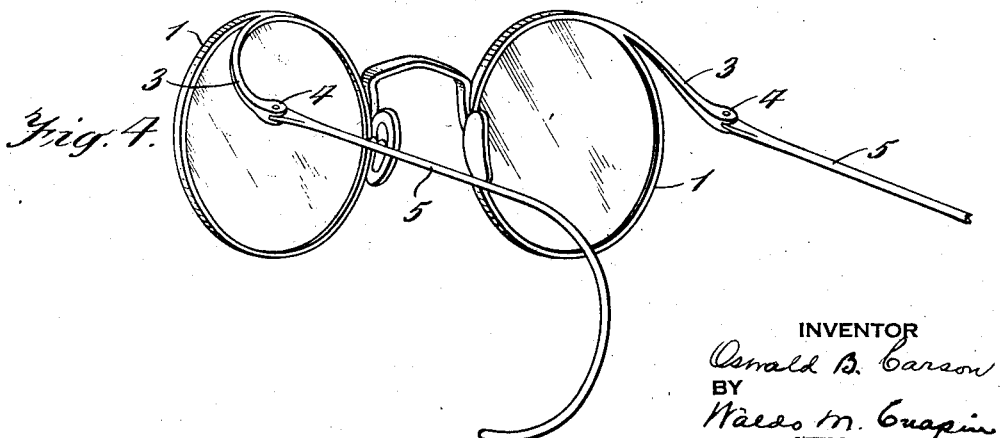
Fig. 4 is a rear perspective view of a modified form of my invention.

In Fig. 4 the links 3 are shown formed integral with the rims, either made in one piece therewith or being attached thereto as by soldering, welding, or the like. This construction has all the advantages in use of the hinged construction and has the additional advantage that the joint between the links and the rims may be made smaller and therefore less conspicuous.

It is obvious that my invention may be utilized upon rimless glasses merely by attaching the links to the lenses by means of the usual straps by which temples are commonly attached to lenses, in which case the links would come away from the rear face of the straps in order to avoid an objectionably conspicuous joinder.

It is also obvious that I may employ rims, temples and links of metal or pyroxalin or any combination thereof.

It is further obvious that I may employ lenses or lens rims of any usual contour such as round, oval, ovoid, octagonal, or modifications thereof.

I claim:—

1. In a pair of spectacles, the combination with the lenses of links mounted upon the upper peripheral portion thereof, extending therefrom outwardly, downwardly and rearwardly following the peripheral contour of the lenses and terminating in connecting means for the attachment of the temples.

2. In a pair of spectacles, the combination with the lenses of bendably adjustable links mounted upon the upper peripheral portion thereof, extending therefrom rearwardly, outwardly and downwardly following the peripheral contour of the lenses and terminating in means for the attachment of the temples.

3. In a pair of spectacles, the combination with the lenses of bendably adjustable members interposed between the lenses and the temples, one end of such members being attached to the upper peripheral portions of the lenses, extending therefrom rearwardly, outwardly and downwardly in an arc approximating that of the outer peripheral curvature of the lenses, and the other end being attached to the temples.

4. A pair of spectacles having interposed between the lens frames and the temples pivotally movable links adjustable to vary the distance between the points of joinder of the respective temples.

5. A pair of spectacles having links intermediate the upper rims of the lenses and the temples, such links being adjustable to position the lenses at different vertical angles with respect to the normal line of vision.

6. A pair of spectacles having links intermediate the upper rims of the lenses and the temples following the outer peripheral curvature of said rims, such links being adjustable to vary the distance between the points of joinder of the respective temples and to position the lenses at desired varying vertical angles with respect to the normal line of vision.

7. In a pair of spectacles, lens frames having integral extensions on their upper peripheral portions extending rearwardly therefrom at a tangential angle, then outwardly and downwardly in a manner to conform to the upper outer peripheral contour of the lenses.

8. In a pair of spectacles, the combination with the lenses of pliable links integrally attached thereto at the upper peripheral portion thereof and to the rear thereof, extending therefrom in an arc approximating the upper, outer, peripheral contour of the lenses rearwardly, outwardly and downwardly, and terminating in means for the attachment of the temples.

9. In a pair of spectacles, the combination with the lenses of bendably adjustable members interposed between the lenses and the temples, one end of such members being pivotally attached to the upper peripheral portions of the lenses and to the rear thereof so that in folding the temples the links will be free to swing forward beyond the front face of the lenses, said links extending from the lenses rearwardly, outwardly and downwardly in a manner to conform to the upper, outer, peripheral contour of the lenses.

10. In a pair of spectacles, the combination with the lenses of pivotally linked intermediate members interposed between the upper peripheral portion of the lenses and the temple bars, said intermediate members positioned in such a way that they normally and substantially lie within the stereometrical projection of the lens rims, drawn at right angles to the plane of the lenses.

In testimony whereof, I affix my signature.

OSWALD B. CARSON.